United States Patent
Aschaber et al.

(10) Patent No.: US 9,050,877 B2
(45) Date of Patent: Jun. 9, 2015

(54) MOTOR VEHICLE HAVING A ROOF OPENING

(71) Applicants: Christoph Aschaber, Graz (AT); Claus Careni, Bietigheim-Bissingen (DE); Berthold Klein, Sachsenheim (DE); Wolfgang Richter, Commerce Township, MI (US); Martin Rodler, Krottendorf (AT)

(72) Inventors: Christoph Aschaber, Graz (AT); Claus Careni, Bietigheim-Bissingen (DE); Berthold Klein, Sachsenheim (DE); Wolfgang Richter, Commerce Township, MI (US); Martin Rodler, Krottendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/782,079

(22) Filed: Mar. 1, 2013

(65) Prior Publication Data
US 2014/0077532 A1    Mar. 20, 2014

(30) Foreign Application Priority Data
Mar. 1, 2012  (DE) .......................... 10 2012 101 752

(51) Int. Cl.
*B60J 7/06*  (2006.01)
*B60J 7/047* (2006.01)

(52) U.S. Cl.
CPC . *B60J 7/047* (2013.01); *B60J 7/061* (2013.01)

(58) Field of Classification Search
CPC .................................. B60J 7/06; B60J 7/061
USPC ..................... 296/219, 107.01–107.2, 220.01
See application file for complete search history.

(56) References Cited

U.S. PATENT DOCUMENTS

| 1,860,463 | A | * | 5/1932 | Kaplan et al. | 296/219 |
|---|---|---|---|---|---|
| 2,921,814 | A | * | 1/1960 | Mede | 296/215 |
| 4,130,966 | A | * | 12/1978 | Kujawa et al. | 49/141 |
| 4,161,336 | A | * | 7/1979 | LeVan et al. | 296/218 |
| 5,310,241 | A | * | 5/1994 | Omoto et al. | 296/219 |
| 7,240,960 | B2 | * | 7/2007 | Fallis et al. | 296/218 |

FOREIGN PATENT DOCUMENTS

| DE | 4142265 C1 | 12/1992 |
|---|---|---|
| DE | 69001747 T2 | 9/1993 |
| DE | 102006000725 A1 | 7/2006 |
| WO | WO2011/148069 | * 12/2011 |
| WO | WO 2011/148069 | * 12/2011 |

* cited by examiner

*Primary Examiner* — Dennis H Pedder
(74) *Attorney, Agent, or Firm* — Jordan IP Law, LLC; Todd A. Vaughn

(57) ABSTRACT

A motor vehicle with a roof opening in a fixed roof surface of the motor vehicle and a roof mechanism configured to close and at least partially open the roof opening. The roof mechanism includes a front folding roof system having a front folding-top configured to close and at least partially open a front region of the roof opening, a rear folding roof system having a rear folding-top configured to close and at least partially open a rear region of the roof opening; guide rails configured to permit displacement of the front and rear folding top, respectively, to close and at least partially open the front ad rear regions of the roof opening.

19 Claims, 3 Drawing Sheets

MOTOR VEHICLE HAVING A ROOF OPENING

CROSS-REFERENCE TO RELATED APPLICATIONS

The present application claims priority under 35 U.S.C. §119 to German Patent Application Nos. DE 10 2012 101 752.2 (filed on Mar. 1, 2012) and DE 10 2012 210 148.9 (filed on Jun. 15, 2012), which are each hereby incorporated by reference in its entirety.

TECHNICAL FIELD

Embodiments relate to a motor vehicle having a roof opening in a fixed roof surface of the motor vehicle and with at least one roof mechanism configured to optionally close and at least partially open the roof opening, the roof opening having a front folding roof system and a rear folding roof system.

BACKGROUND

DE3828062C2 discloses a vehicle roof with an adjustable roof mechanism for optionally closing and at least partially opening up a roof opening in a fixed roof surface of the vehicle. The roof mechanism includes a combination of a spoiler roof on the front side and a folding roof on the rear side, the spoiler roof and the folding roof both being adjustable along longitudinally running guide rails which are arranged on both sides of the roof opening.

A drawback to this design, however, is that the spoiler roof on the front side and the folding roof on the rear side are moveably linked, i.e., may be selectively moved together in unison into an open or a closed position. Also, the roof mechanism may open only in a single direction, e.g., in a rearward direction relative to the vehicle.

SUMMARY

In accordance with embodiments, an enhanced roof mechanism which is flexible is provided in such a manner that the abovementioned drawbacks are eliminated.

In accordance with embodiments, a motor vehicle includes a roof opening, a fixed roof surface, and at least one roof mechanism configured to optionally close and at least partially open the roof opening. The roof mechanism has a front folding roof system having a front folding-top cloth and a rear folding roof system having a rear folding-top cloth. A front region of the roof opening may be closed or at least partially opened by the front folding roof system and a rear region of the roof opening may be closed or at least partially opened by the rear folding roof system.

In accordance with embodiments, the front folding roof system and the rear folding roof system are configured to be selectively manipulated to close or at least partially open the roof opening by way of displacement along longitudinally running guide rails which are arranged on both sides of the roof opening.

In accordance with embodiments, the front folding roof system and the rear folding roof system may be closed or opened independently of each other.

In accordance with embodiments, the longitudinally running guide rails are respectively integrated in a front roof frame and in a rear roof frame. The guide rails serve to receive the moveable roof elements and have at least one channel for receiving a driving cable for actuating the roof mechanism.

In accordance with embodiments, the longitudinally running guide rails of the front roof frame and of the rear roof frame are not operatively and/or structurally connected to each other.

In accordance with embodiments, the rear region of the roof opening is preferably configured to be larger in size than the front region of the roof opening.

In accordance with embodiments, the rear folding-top cloth is arranged on a rear roof frame, wherein the rear roof frame constitutes a rearwardly open U-shape. In this case, the rear roof opening may be closed or opened in forward and/or rearward directions relative to the vehicle by the folding-top cloth.

These features advantageously make it possible to provide a large loading compartment when the folding top is opened forwards. This enables simple loading even with relatively high luggage, such as, for example, bicycles, in a simple manner.

In accordance with embodiments, the folding roof systems are configured to be selectively actuable, for example, by way of electric motors. In this case, the electric motors act via driving cables on a mechanism, for example, driving slides, which bring the folding-top cloths into an open or closed position corresponding to the drivers requirements.

In accordance with embodiments, for example, one electric motor is provided for the front folding roof system and more than one (e.g., two) electric motor is provided for the rear folding roof system. It is also possible, however, to use only one electric motor for the rear folding roof system. The electric motors may also be operated in such a manner that the rear folding-top cloth may also be moved in both forward and rearward directions simultaneously and may take up any desired intermediate position between the front and the rear storage position.

For the front folding roof system, the electric motor is arranged on a support frame of the front roof frame. For the rear folding roof system, the electric motors are arranged on a driving cross member of the rear roof frame.

In accordance with embodiments, other driving systems are also useable in addition or alternative to electric motors.

In accordance with embodiments, an encircling module frame which is customary for a roof opening for folding tops is not used since, because of the rear, U-shaped roof frame which is open rearwards, no additional torsional rigidity is achieved. Moreover, because the module frame has a rear transverse frame, the loading option is restricted. By omitting the module frame, the overall height for the folding roof systems and the vehicle weight may be reduced.

In accordance with embodiments, the opened front folding roof system, in the opened state of the rear roof region, is configured to also function as a wind deflector. This means that no unpleasant swirling of air arises in the vehicle interior for vehicle occupants sitting in the rear region.

In accordance with embodiments, the front folding roof system and/or rear folding roof system may have transparent elements having a stiff or rigid structural design. During the opening operation, the folding roof systems are folded in the region of the folding-top cloth in such a manner that the transparent elements are stored spatially stacked one above another. The transparent elements may preferably have different widths and/or lengths and/or shapes. A desired optical effect may therefore be achieved.

In accordance with embodiments a motor vehicle comprises a roof opening in a fixed roof surface of the motor vehicle; a roof mechanism configured to close and at least partially open the roof opening, the roof mechanism comprising: a front folding roof system having a front folding-top configured to close and at least partially open a front region of the roof opening; rear folding roof system having a rear folding-top configured to close and at least partially open a rear region of the roof opening; front guide rails configured to permit displacement of the front folding top to close and at least partially open the front region of the roof opening; and rear guide rails configured to permit displacement of the rear folding top to close and at least partially open a rear region of the roof opening, wherein the front folding roof system and the rear folding roof system are configured to be closed and opened independently of each other.

In accordance with embodiments a roof mechanism for a motor vehicle, comprises: a roof mechanism configured to close and at least partially open a roof opening in the motor vehicle, the roof mechanism comprising: a front folding roof system having a front folding-top configured to close and at least partially open a front region of the roof opening; a rear folding roof system having a rear folding-top configured to close and at least partially open a rear region of the roof opening; front guide rails configured to permit displacement of the front folding top to close and at least partially open the front region of the roof opening; and rear guide rails configured to permit displacement of the rear folding top to close and at least partially open a rear region of the roof opening, wherein the front folding roof system and the rear folding roof system are configured to be closed and opened independently of each other.

In accordance with embodiments a roof mechanism for a motor vehicle comprises: a roof mechanism configured to close and at least partially open a roof opening in the motor vehicle, the roof mechanism comprising: a front folding roof system having a front folding-top configured for displaceable movement to close and at least partially open a front region of the roof opening; and a rear folding roof system having a rear folding-top configured for displaceable movement to close and at least partially open a rear region of the roof opening, wherein the front folding roof system and the rear folding roof system are configured for displaceable movement independently of each other.

DRAWINGS

Embodiments are described by way of example below with reference to the drawings.

DESCRIPTION

Figure 1:
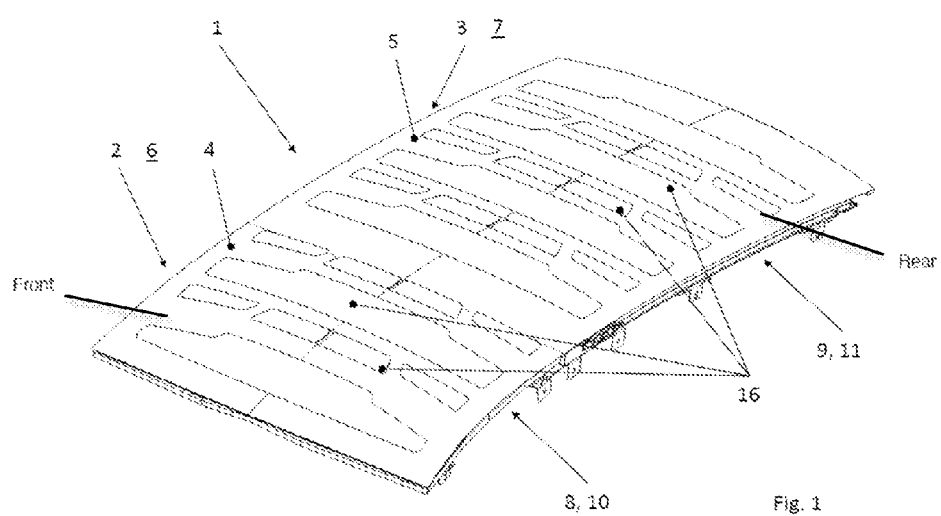
FIG. 1 illustrates a roof mechanism in a closed state, in accordance with embodiments.

As illustrated in FIG. 1, a roof mechanism 1 is represented in the closed state. The roof mechanism 1 includes a front folding roof system 2 and a rear folding roof system 3. A front folding-top cloth 4 assigned to a front roof frame 10 is configured to close and at least partially open a front region of the roof opening 6. A rear folding-top cloth 5 is assigned to a rear roof frame 11 and configured to close and at least partially open a rear region of the roof opening 7. In the front and rear roof frames 10, 11, guide rails 8, 9 which are not structurally and/or operatively connected to each other are respectively integrated in the front and rear roof frames 10, 11. The guide rails 8, 9 serve to receive the moveable roof elements. The front and the rear folding-top cloths 4, 5 have transparent roof elements 16 which may have different widths and/or lengths and/or shapes.

Figure 2:
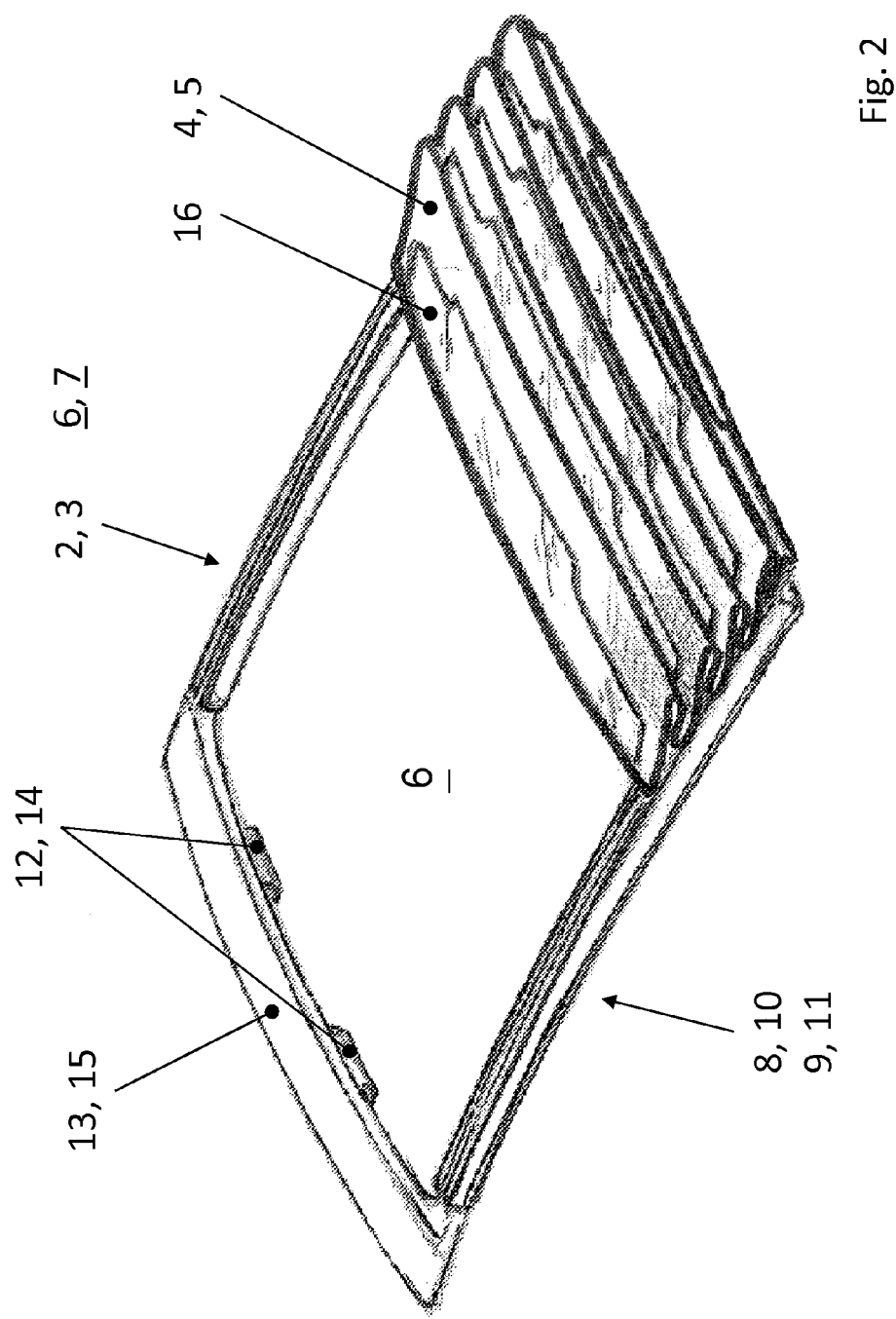
FIG. 2 illustrates a rear folding roof system in a first type of opened state, in accordance with embodiments.

As illustrated in FIG. 2, one possible opening form of the rear folding roof system 3 is provided. The position of the opened rear folding-top cloth 5 is configured for use as a ventilation opening. The guide rails 9 running longitudinally in the direction of the vehicle are arranged on both sides of the vehicle and are structurally and/or operatively connected to each other by a driving cross member 15. The electric motors 14 required for opening the folding-top cloth 5 are arranged in the region of the driving cross member 15. The two guide rails 9 and the driving cross member 15 together substantially form the rear roof frame 11.

FIG. 2 may also be presented as an open position for the front folding roof system 2. In the opened state, the front folding-top cloth 4 is opened rearwards as seen in the longitudinal direction of the vehicle. The opened front folding-top cloth 4 is also configured in the open state at the same time as a wind deflector for the rear region of the roof opening 7. The guide rails 8 together with the support frame 13 and a rear transverse connection (not illustrated) here form the front roof frame 10. In the region of the folding-top cloth 4, 5, the folding roof systems 2, 3 are folded in such a manner that the transparent elements are stored stacked one above another.

Figure 3:
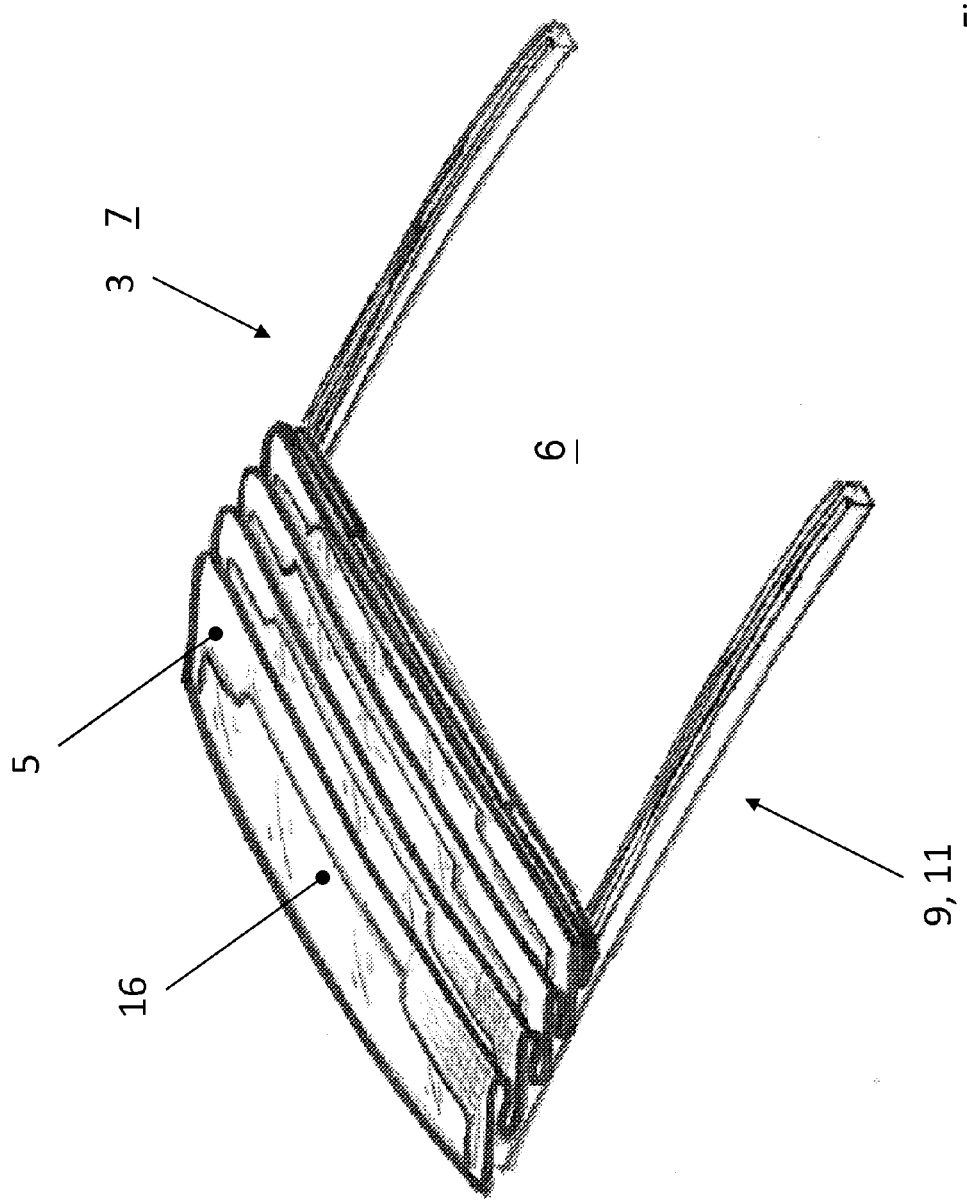
FIG. 3 illustrates a rear folding roof system in another type of opened state, in accordance with embodiments.

As illustrated in FIG. 3, the rear folding-top cloth 5 is opened in a forwards direction, as a result of which a large loading compartment becomes free at the rear, and, owing to the rearwardly open U-shape of the rear roof frame 11, it is possible to load bulky luggage, such as, for example, bicycles, into the vehicle in a simple manner for transportation.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

1 Roof mechanism
2 Front folding roof system
3 Rear folding roof system
4 Front folding-top cloth
5 Rear folding-top cloth
6 Front region of roof opening
7 Rear region of roof opening
8 Guide rail
9 Guide rail
10 Front roof frame
11 Rear roof frame
12 Electric motor of front folding-top cloth
13 Support frame
14 Electric motor of rear folding-top cloth
15 Driving cross member
16 Transparent elements

What is claimed is:

1. A roof mechanism for a roof opening of a motor vehicle, comprising:

front guide rails and rear guide rails;

a front folding-top selectively displaceable on the front guide rails to close and at least partially open a front region of the roof opening; and a rear folding-top selectively displaceable on the rear guide rails independently of the front folding-top to close and at least partially open a rear region of the roof opening, and is selectively openable in forward and rearward directions, and displaceable to a front storage position and a rear storage position, wherein the front folding-top and the rear folding-top abut each other to form a continuous folding-top surface to close the front region and the rear region of the roof opening.

2. The roof mechanism of claim 1, wherein the front folding-top is configured as a wind deflector when selectively displaceable to at least partially open the front region.

3. The roof mechanism of claim 1, further comprising a motor to selectively displace the front folding-top.

4. The roof mechanism of claim 1, further comprising at least one motor to selectively displace the rear folding-top.

5. The roof mechanism of claim 1, wherein the front folding-top is selectively displaceable independently of the rear folding-top.

6. The roof mechanism of claim 1, wherein the rear folding-top has a size greater than the front folding-top.

7. A roof mechanism for a roof opening of a motor vehicle, comprising:
    a front folding-top selectively displaceable to close and at least partially open a front region of the roof opening;
    a rear folding-top selectively displaceable to close and at least partially open a rear region of the roof opening, and in which the rear region of the roof opening is selectively openable by a movement of the rear folding-top in a forward direction, and is also selectively openable by a movement of the rear folding-top in a rearward direction,
    wherein the front folding-top and the rear folding-top are selectively displaceable independently of each other, and also abut each other to form a continuous folding-top surface to close the front region and the rear region of the roof opening.

8. The roof mechanism of claim 7, wherein the front folding-top is configured as a wind deflector when selectively displaceable to at least partially open the front region.

9. The roof mechanism of claim 7, further comprising a motor to selectively displace the front folding-top.

10. The roof mechanism of claim 7, further comprising at least one motor to selectively displace the rear folding-top.

11. The roof mechanism of claim 7, further comprising:
    a first motor to selectively displace the front folding-top; and
    at least one second motor to selectively displace the rear folding-top.

12. The roof mechanism of claim 7, wherein the rear folding-top has a size greater than the front folding-top.

13. A motor vehicle having a roof opening and:
    a roof mechanism that includes:
        a front folding-top selectively displaceable to close and at least partially open a front region of the roof opening; and
        a rear folding-top selectively displaceable on rear guide rails independently of the front folding-top to close and at least partially open a rear region of the roof opening in a manner such that the rear region of the roof opening is selectively openable in a first open state by a movement of the rear folding-top in a forward direction, and a second open state by a movement of the rear folding-top in a rearward direction,
    wherein the front folding-top and the rear folding-top abut each other to form a continuous folding-top surface to close the front region and the rear region of the roof opening.

14. The motor vehicle of claim 13, wherein the front folding-top is configured as a wind deflector when selectively displaceable to at least partially open the front region.

15. The motor vehicle of claim 13, further comprising a motor to selectively displace the front folding-top.

16. The motor vehicle of claim 13, further comprising at least one motor to selectively displace the rear folding-top.

17. The motor vehicle of claim 13, further comprising:
    a first motor to selectively displace the front folding-top; and
    at least one second motor to selectively displace the rear folding-top.

18. The motor vehicle of claim 13, wherein the rear folding-top has a size greater than the front folding-top.

19. The motor vehicle of claim 13, wherein the front folding-top and the rear folding-top are selectively displaceable independently of each other.

* * * * *